US012744211B2

(12) United States Patent
Kwon et al.

(10) Patent No.: US 12,744,211 B2
(45) Date of Patent: Sep. 22, 2026

(54) POSITIVE ELECTRODE AND LITHIUM SECONDARY BATTERY MANUFACTURED USING SAME

(71) Applicant: LG Energy Solution, Ltd., Seoul (KR)

(72) Inventors: O Jong Kwon, Daejeon (KR); Jung Hun Choi, Daejeon (KR); Ju Ryoun Kim, Daejeon (KR); Yong Hee Kang, Daejeon (KR); Ji Eun Kim, Daejeon (KR); Min Chul Jang, Daejeon (KR); Ki Woong Kim, Daejeon (KR); In Gu An, Daejeon (KR); Jeong Geun Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 454 days.

(21) Appl. No.: 18/287,966

(22) PCT Filed: Dec. 23, 2022

(86) PCT No.: PCT/KR2022/021208

§ 371 (c)(1),
(2) Date: Oct. 23, 2023

(87) PCT Pub. No.: WO2023/121397

PCT Pub. Date: Jun. 29, 2023

(65) Prior Publication Data

US 2024/0194872 A1 Jun. 13, 2024

(30) Foreign Application Priority Data

Dec. 24, 2021 (KR) ........................ 10-2021-0187035

(51) Int. Cl.
*H01M 4/58* (2010.01)
*C01G 49/00* (2006.01)
(Continued)

(52) U.S. Cl.
CPC ........ *H01M 4/5825* (2013.01); *C01G 49/009* (2013.01); *H01M 4/131* (2013.01);
(Continued)

(58) Field of Classification Search
None
See application file for complete search history.

(56) References Cited

U.S. PATENT DOCUMENTS

2009/0155689 A1 6/2009 Zaghib et al.
2012/0202113 A1 8/2012 Hodge et al.
(Continued)

FOREIGN PATENT DOCUMENTS

CN 101327920 A 12/2008
CN 111403732 A 7/2020
(Continued)

OTHER PUBLICATIONS

English-language machine translation of KR-20220021771-A. (Year: 2026).*

(Continued)

*Primary Examiner* — Eli S Mekhlin
(74) *Attorney, Agent, or Firm* — Lerner David LLP

(57) ABSTRACT

A positive electrode includes a positive electrode active material layer, and the positive electrode active material layer includes a first lithium iron phosphate and a second lithium iron phosphate as a positive electrode active material, the first lithium iron phosphate has an average particle diameter $D_{50}$ grater than that of the second lithium iron phosphate and at least one facet, and when the cross section of the positive electrode is observed with a scanning electron microscope (SEM), the cross section of the first lithium iron phosphate has at least one side having a length of 2 μm or more.

14 Claims, 7 Drawing Sheets

(51) Int. Cl.

| | |
|---|---|
| ***H01M 4/02*** | (2006.01) |
| ***H01M 4/131*** | (2010.01) |
| ***H01M 4/62*** | (2006.01) |
| ***H01M 10/052*** | (2010.01) |

(52) U.S. Cl.

CPC ............. *H01M 4/62* (2013.01); *H01M 4/625* (2013.01); *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2013/0065120 | A1 | 3/2013 | Miwa et al. |
| 2013/0147439 | A1 | 6/2013 | Takahashi |
| 2013/0149604 | A1 | 6/2013 | Fujiki et al. |
| 2015/0064557 | A1 | 3/2015 | Kim et al. |
| 2020/0028174 | A1 | 1/2020 | Ahn et al. |
| 2021/0122639 | A1 | 4/2021 | Choi et al. |

FOREIGN PATENT DOCUMENTS

| | | | | | |
|---|---|---|---|---|---|
| CN | 112103464 | A | | 12/2020 | |
| CN | 112952050 | A | | 6/2021 | |
| CN | 113422049 | A | | 9/2021 | |
| JP | 2002208401 | A | | 7/2002 | |
| JP | 2013065397 | A | | 4/2013 | |
| JP | 2013069677 | A | | 4/2013 | |
| JP | 2013120724 | A | | 6/2013 | |
| JP | 2013120736 | A | | 6/2013 | |
| JP | 2013531871 | A | | 8/2013 | |
| JP | 5564872 | B2 | | 8/2014 | |
| JP | 2015536026 | A | | 12/2015 | |
| JP | 2020043009 | A | | 3/2020 | |
| JP | 2020515014 | A | | 5/2020 | |
| JP | 2021529417 | A | | 10/2021 | |
| KR | 20130035481 | A | | 4/2013 | |
| KR | 20140012008 | A | | 1/2014 | |
| KR | 20140146946 | A | | 12/2014 | |
| KR | 20150026863 | A | | 3/2015 | |
| KR | 20150042807 | A | | 4/2015 | |
| KR | 20180107759 | A | | 10/2018 | |
| KR | 102227302 | B1 | | 3/2021 | |
| KR | 20210052320 | A | | 5/2021 | |
| KR | 20220021771 | A | * | 2/2022 | ............ H01M 4/622 |
| WO | 2015005228 | A1 | | 1/2015 | |

OTHER PUBLICATIONS

Ma, Z. et al., "Tunable Morphology Synthesis of LiFePO4 Nanoparticles as Cathode Materials for Lithium Ion Batteries", ACS Appl. Mater. Interfaces, May 22, 2014, pp. 9236-9244.

Huang, X. et al., "Concentration-controlled morphology of LiFePO4 crystals with an exposed (100) facet and their enhanced performance for use in lithium-ion batteries", Journal of Alloys and Compounds, Feb. 2018, vol. 763, pp. 763-772.

International Search Report for PCT/KR2022/021208 mailed Mar. 29, 2023. 3 pages.

* cited by examiner

[FIG. 1]
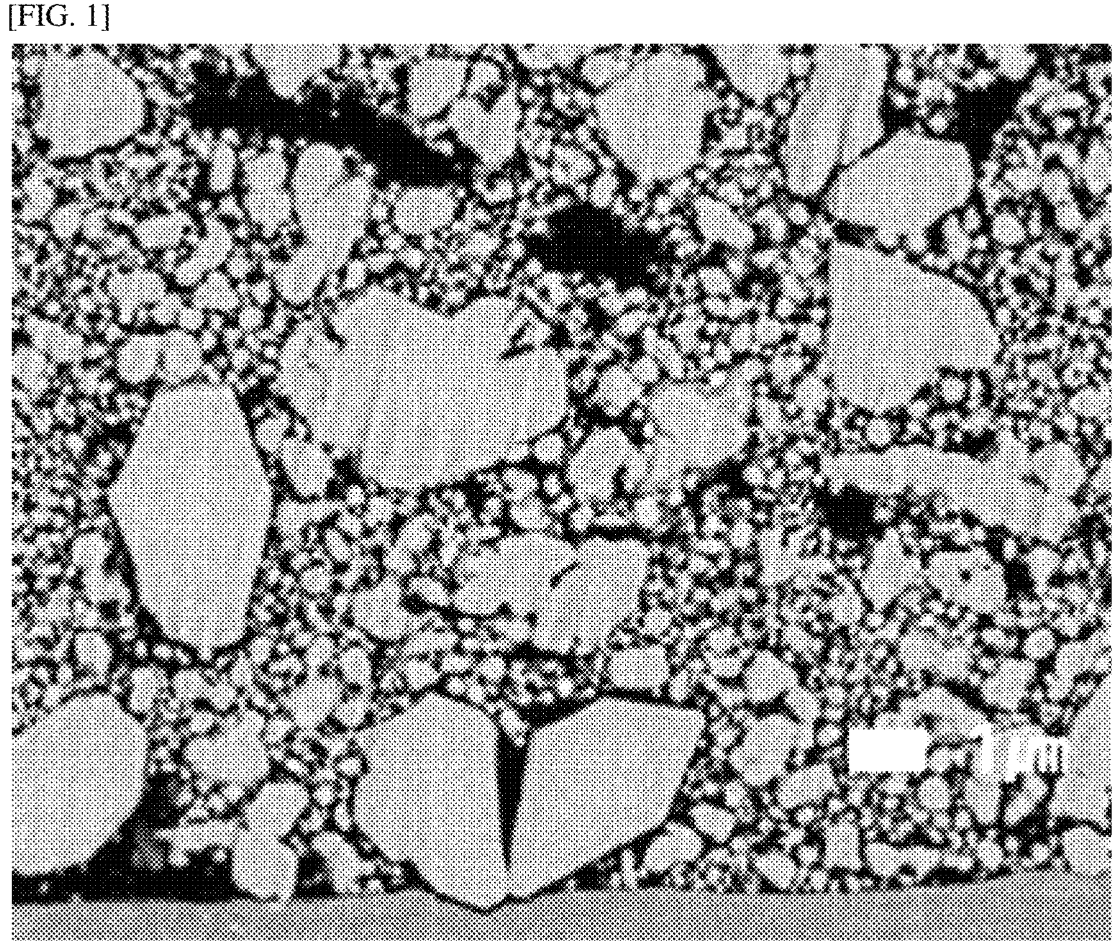

[FIG. 2]
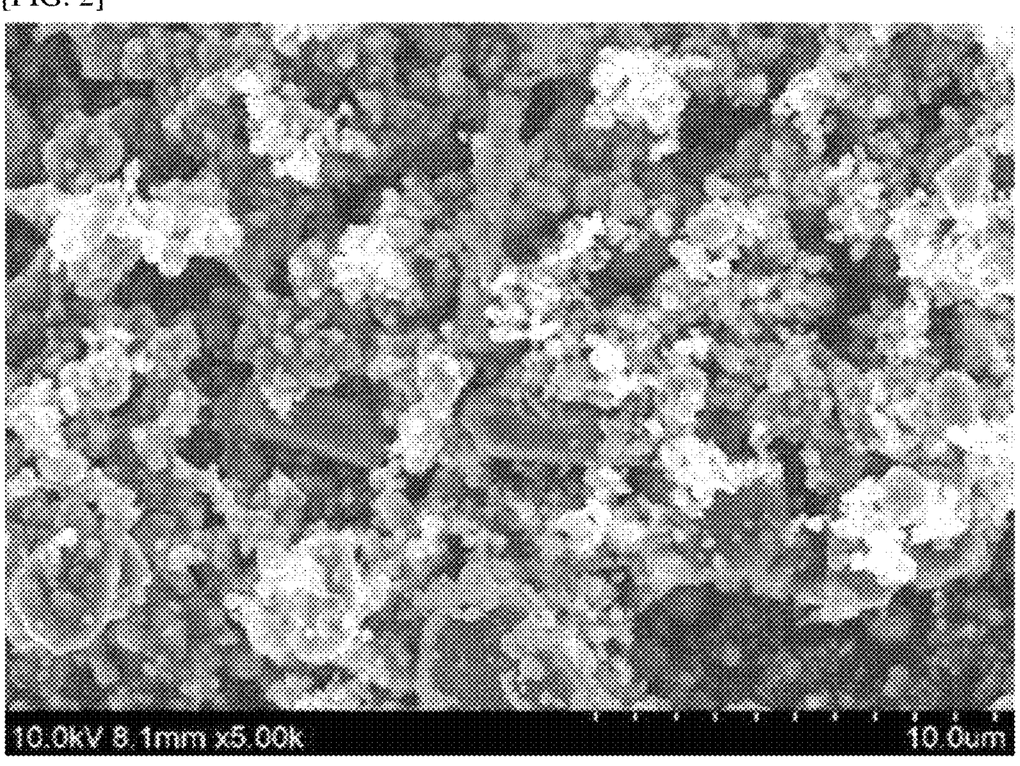

[FIG. 3]
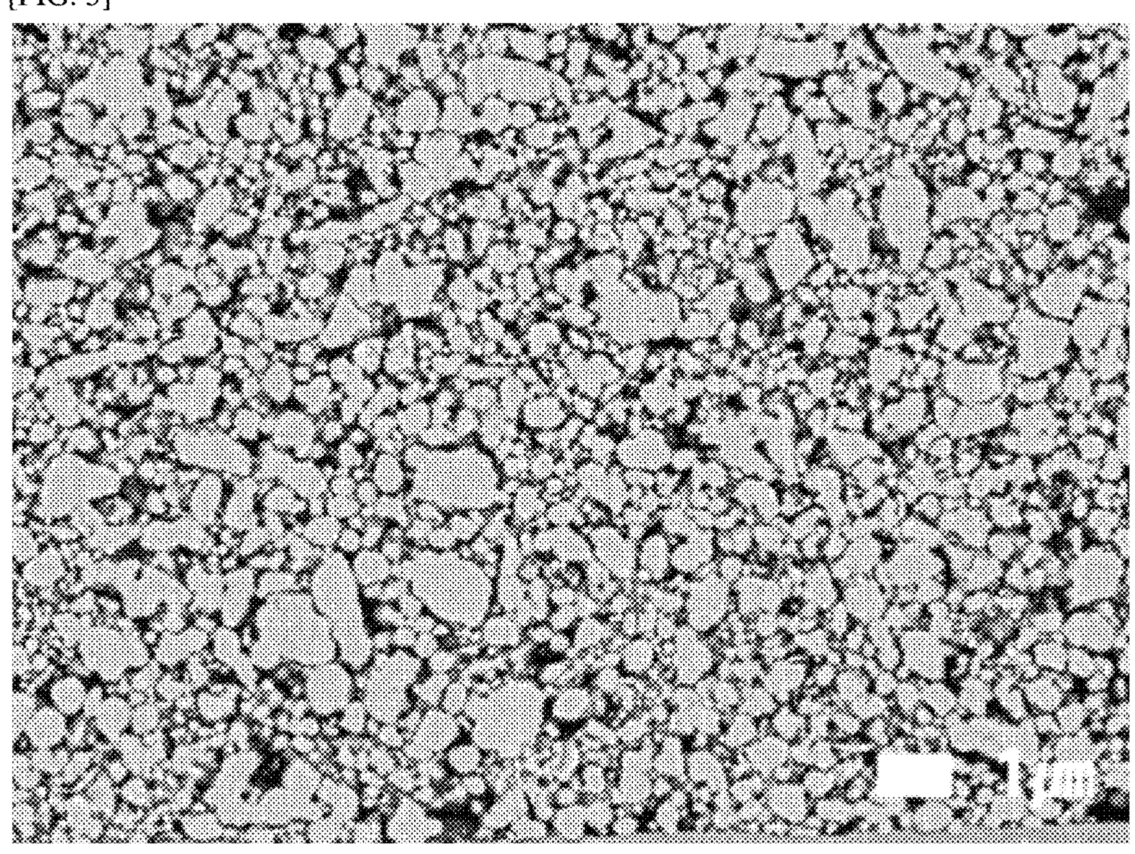

[FIG. 4]
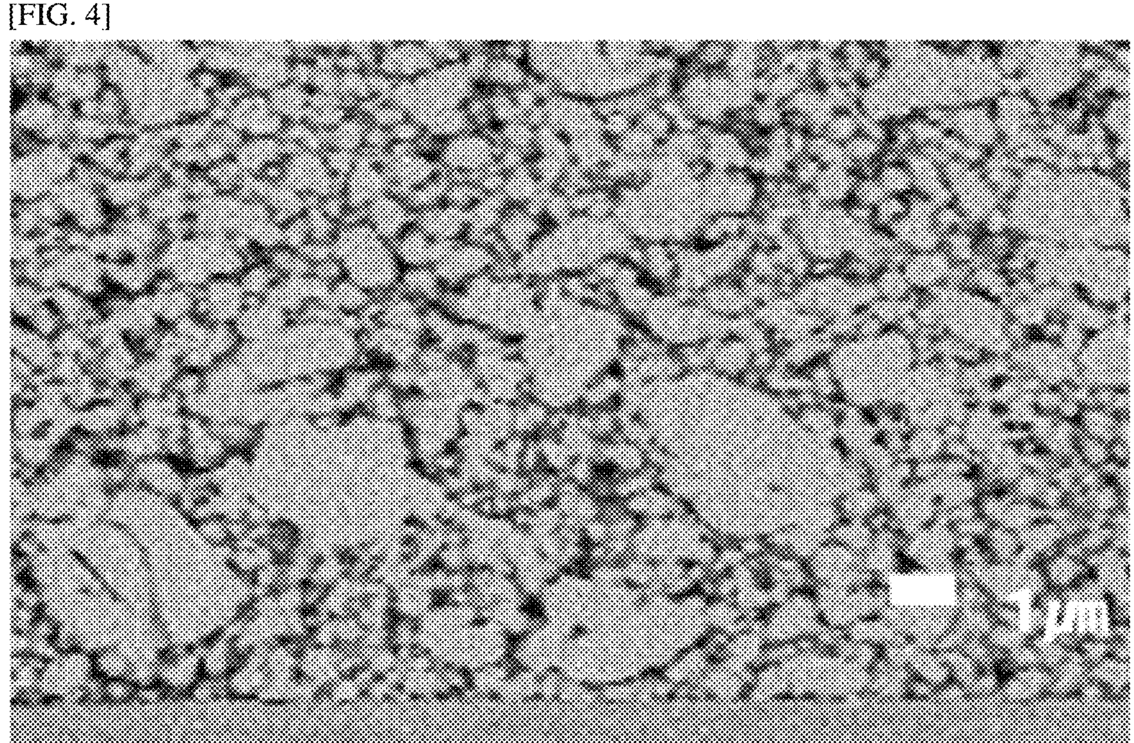

[FIG.5]
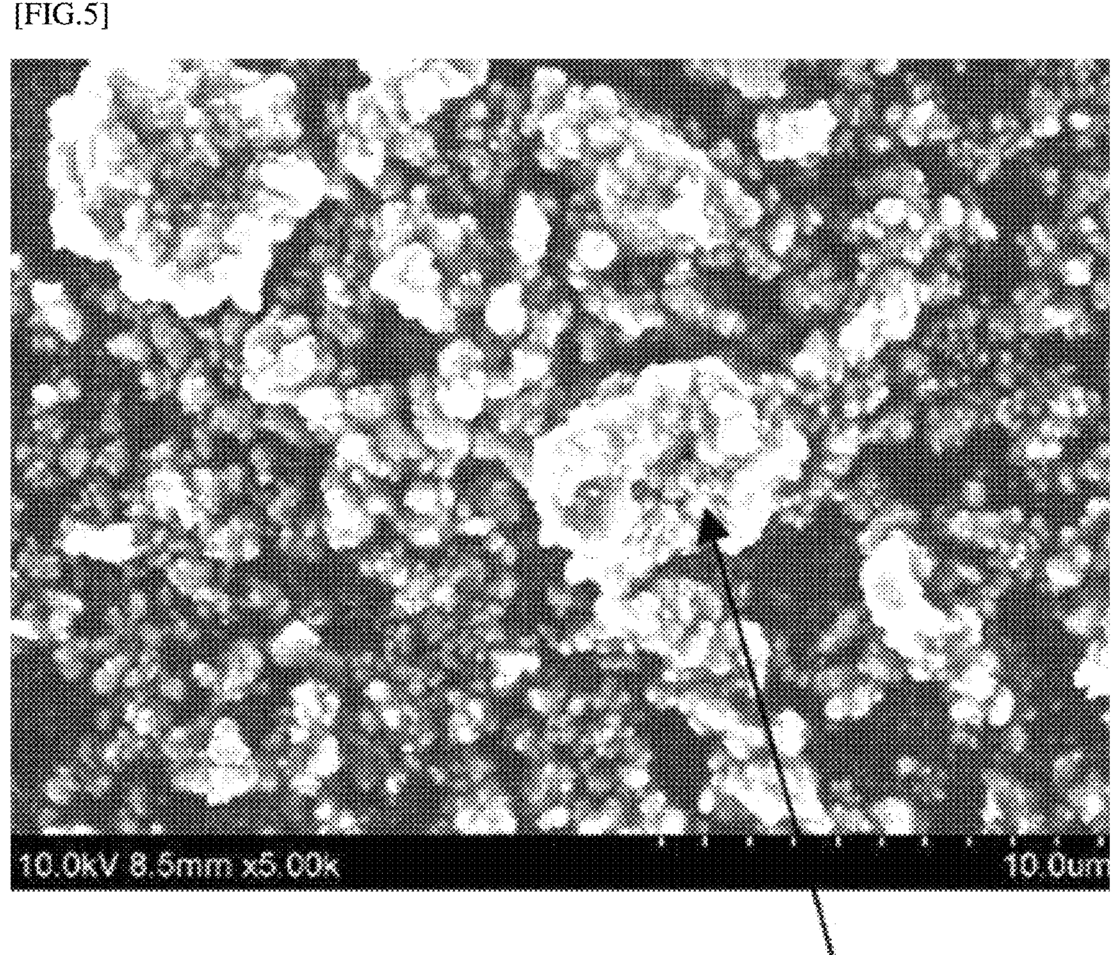
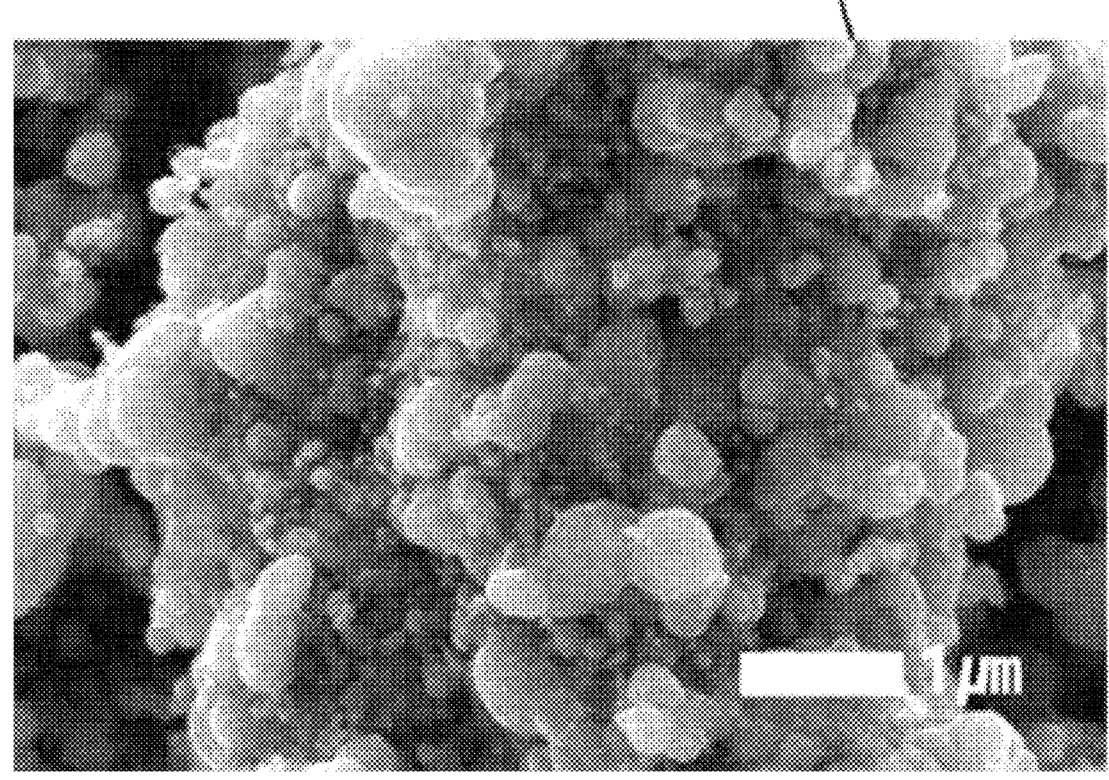

[FIG. 6]
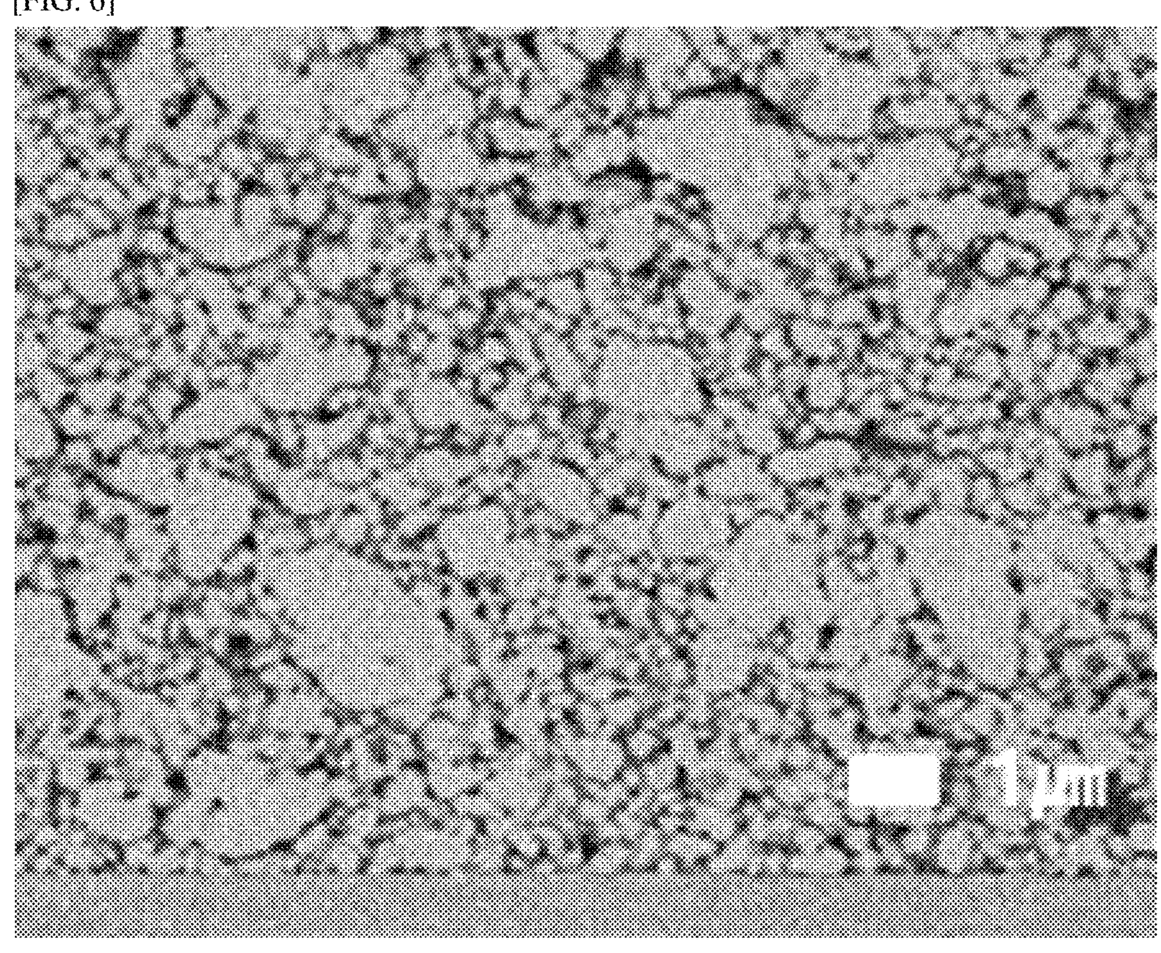

[FIG. 7]
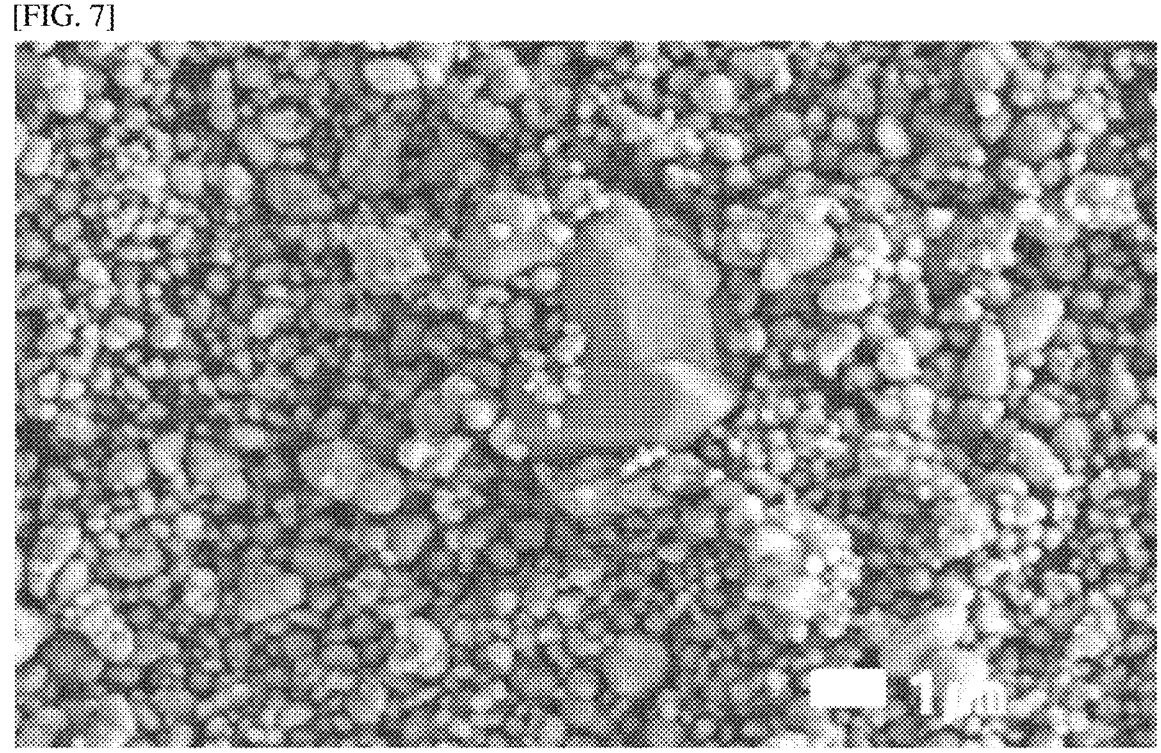

POSITIVE ELECTRODE AND LITHIUM SECONDARY BATTERY MANUFACTURED USING SAME

CROSS-REFERENCE TO RELATED APPLICATION

This application is a national phase entry under 35 U.S.C. § 371 of International Application No. PCT/KR2022/021208, filed Dec. 23, 2022, which claims priority to Korean Patent Application No. 10-2021-0187035 filed on Dec. 24, 2021, the disclosure of which are incorporated by reference in their entireties.

TECHNICAL FIELD

The present disclosure relates to a positive electrode and a lithium secondary battery prepared by using the same, and more specifically, it relates to a positive electrode including lithium iron phosphate having a facet and a lithium secondary battery prepared by using the same.

BACKGROUND TECHNOLOGY OF THE INVENTION

As demands and technology developments for electric vehicles and energy storage system (ESS) increase, the demand for batteries as an energy source is rapidly increasing, and accordingly, various studies have been conducted on batteries that can meet various needs. In particular, research on lithium secondary batteries having a high energy density, an excellent lifespan, and excellent cycle characteristics as a power source for such devices has been actively conducted.

As a positive electrode active material for lithium secondary batteries, lithium cobalt-based oxide (LCO), lithium nickel-cobalt-manganese-based oxide (LNCMO), lithium iron phosphate (LFP), and the like are used.

Lithium iron phosphate is inexpensive because it contains iron, which is an abundant resource and an inexpensive material. In addition, since the toxicity of lithium iron phosphate is low, environmental pollution can be reduced when lithium iron phosphate is used. Moreover, since lithium iron phosphate has an olivine structure, the active material structure can be stably maintained at a high temperature compared to a lithium transition metal oxide with a layered structure. Accordingly, there is an advantage in that the battery has an improved high-temperature stability and high-temperature lifespan characteristics.

However, compared to lithium transition metal oxides such as lithium nickel cobalt manganese oxide, lithium iron phosphate has a problem in that lithium mobility is low and electrical conductivity is low. Accordingly, conventionally, by reducing the average particle diameter of lithium iron phosphate, the lithium movement path is shortened, and thus one with an improved lithium ion mobility is used. However, as the size of the lithium iron phosphate particles decreases, the specific surface area increases, and as a result, aggregation of particles occurs severely, so lithium iron phosphate and a binder cannot be effectively mixed, thereby reducing the adhesive force (hereinafter referred to as positive electrode adhesive force) between a positive electrode current collector and a positive electrode active material layer in a prepared positive electrode.

When the positive electrode adhesive force decreases, deintercalation of the positive electrode active material layer occurs during electrode preparation or charging/discharging, resulting in an increase in battery resistance and a reduction in capacity of the secondary battery. Therefore, there is a need for a technology for improving positive electrode adhesive force in a positive electrode containing lithium iron phosphate.

DESCRIPTION OF THE INVENTION

Technical Problem

The present disclosure is directed to provide a positive electrode and a lithium secondary battery in which electrode deintercalation is prevented, battery resistance is reduced, and battery capacity is improved by improving adhesive force between a positive electrode current collector and a positive electrode active material layer.

Technical Solution

According to some embodiments of the present disclosure, a positive electrode provided includes a positive electrode active material layer, wherein the positive electrode active material layer includes a first lithium iron phosphate and a second lithium iron phosphate as a positive electrode active material, the first lithium iron phosphate has an average particle diameter $D_{50}$ greater than that of the second lithium iron phosphate, and when the cross section of the positive electrode is observed with a scanning electron microscope (SEM), the cross section of the first lithium iron phosphate has at least one or more side having a length of 2 μm or more.

In some embodiments of the present disclosure, the first lithium iron phosphate and the second lithium iron phosphate may be compounds that are each independently represented by Formula 1 below:

$$Li_{1+a}Fe_{1-x}M_x(PO_{4-b})X_b$$

wherein in Formula 1, M is one or two or more elements selected from the group consisting of Al, Mg, Ni, Co, Mn, Ti, Ga, Cu, V, Nb, Zr, Ce, In, Zn, and T, X includes one or two or more elements selected from the group consisting of F, S, and N, $-0.5 \leq a \leq 0.5$, $0 \leq b \leq 0.1$, and $0 \leq x \leq 0.5$, respectively.

In some embodiments of the present disclosure, the first lithium iron phosphate may be a primary particle having a monolith structure, and may include at least one or more facet on a surface.

In some embodiments of the present disclosure, the average particle diameter $D_{50}$ of the first lithium iron phosphate may be 2 μm to 8 μm.

In some embodiments of the present disclosure, the first lithium iron phosphate may be a particle in a form of a polygonal column.

In some embodiments of the present disclosure, within the positive electrode active material layer, the first lithium iron phosphate and the second lithium iron phosphate may be contained in a volume ratio of from 10:90 to 40:60.

In some embodiments of the present disclosure, the average particle diameter $D_{50}$ of the second lithium iron phosphate may be 1 μm or less.

In some embodiments of the present disclosure, the second lithium iron phosphate may be a secondary particle in which primary particles are aggregated with each other.

In some embodiments of the present disclosure, the positive electrode may include a positive electrode current collector, and the positive electrode active material layer formed on at least one surface of the positive electrode current collector, wherein the adhesive force between the positive electrode current collector and the positive electrode active material layer measured through a 90-degree peel test may be 70 gf/20 mm to 200 gf/20 mm.

In some embodiments of the present disclosure, the positive electrode active material layer may further include a conductor, a binder, and a dispersant.

In some embodiments of the present disclosure, the positive electrode active material layer may include: 94.9 to 97.00 wt % of the positive electrode active material, 0.8 to 1.2 wt % of the conductor, 2.0 to 3.5 wt % of the binder; and 0.2 to 0.4 wt % of the dispersant.

In some embodiments of the present disclosure, the conductor may be a carbon nanotube.

In some embodiments of the present disclosure, the dispersant may be a hydrogenated nitrile butadiene rubber.

In some embodiments of the present disclosure, the positive electrode active material layer may directly face the positive electrode current collector.

According to some embodiments of the present disclosure, a lithium secondary battery including the above-described positive electrode is provided.

Advantageous Effects

The positive electrode according to the present disclosure is characterized in that a large-sized lithium iron phosphate (first lithium iron phosphate) having a facet greater than or equal to a certain size is used together with a small-sized lithium iron phosphate (second lithium iron phosphate) as a positive electrode active material. As in the present disclosure, when a large-sized lithium iron phosphate having a facet greater than or equal to a certain size is included in a positive electrode active material layer, the facet comes into face-to-face contact with a positive electrode current collector, and as a result, the contact area with the positive electrode current collector is widened, resulting in a significant increase in positive electrode adhesive force.

In addition, when a positive electrode slurry is rolled, edges or corners of the first lithium iron phosphate particles are embedded in the positive electrode current collector, thereby increasing adhesion to the positive electrode current collector, and may have an effect of improving the positive electrode adhesive force.

Therefore, the positive electrode and the lithium secondary battery including the positive electrode are prevented from deintercalation of the positive electrode active material layer during electrode manufacturing or charging/discharging, thereby reducing battery resistance and increasing battery capacity.

BRIEF DESCRIPTION OF THE DRAWINGS

FIG. 1 is a SEM image of a cross-section of a positive electrode prepared in Example 1.

FIG. 2 is a SEM image of a positive electrode slurry prepared in Example 1.

FIG. 3 is a SEM image of a cross-section of a positive electrode prepared in Comparative Example 1.

FIG. 4 is a SEM image of a cross-section of a positive electrode prepared in Comparative Example 2.

FIG. 5 is a SEM image of a positive electrode slurry prepared in Comparative Example 2.

FIG. 6 is a SEM image of a cross-section of a positive electrode prepared in Comparative Example 3.

FIG. 7 is a SEM image of a positive electrode slurry prepared in Comparative Example 3.

DETAILED DESCRIPTION

The advantages and features of the present disclosure, and the methods for achieving them will become apparent with reference to the embodiments described below in detail in conjunction with the accompanying drawings. However, the present disclosure is not limited to the embodiments disclosed below, but may be implemented in various different forms, and only these embodiments allow the disclosure of the present disclosure to be complete, and are provided to fully inform the scope of the invention to those skilled in the art to which the present disclosure belongs, and the present disclosure is only defined by the scope of the claims. Like reference numerals refer to like elements throughout.

Unless otherwise defined, all terms (including technical and scientific terms) used in the present specification may be used with meanings that can be commonly understood by those of ordinary skill in the art to which the present disclosure belongs. In addition, the terms defined in commonly used dictionaries are not interpreted ideally or excessively unless explicitly and specifically defined.

The terms used in this specification are for describing the embodiments and are not intended to be limiting of the present disclosure. In this specification, singular forms also include plural forms unless specifically stated otherwise in a phrase. As used herein, "comprise" and/or "comprising" does not exclude the presence or addition of one or more other elements other than the recited elements.

In the present specification, when a part includes a certain component, it means that other components may be further included, rather than excluding other components, unless otherwise stated.

In this specification, the description of "A and/or B" means A, or B, or A and B. In this specification, "%" means wt % unless explicitly indicated otherwise.

In this specification, $D_{50}$ means a particle diameter corresponding to 50% of the cumulative volume in the particle diameter distribution curve of particles. The $D_{50}$ can be measured by using a laser diffraction method. The laser diffraction method is generally capable of measuring particle diameters from a submicron scale to several millimeters, and can obtain results with high reproducibility and high resolvability. For example, after irradiating an active material with ultrasonic waves of about 28 kHz at an output of 60 W using a laser diffraction particle size measuring device (e.g., Microrac MT 3000), the $D_{50}$ is calculated from the particle diameter corresponding to 50% of the cumulative volume measured from the measuring device.

In this specification, a facet means a flat surface forming a crystal, and may be specifically a crystal surface. For example, a facet may be formed on the surface of a primary particle having a monolithic structure. When observing the cross section of an electrode including particles having a facet on the surface with a scanning electron microscope (hereinafter referred to as 'SEM'), the cross section of the particle is observed as a polygon, and the facet may correspond to the side of the polygon. The area value of the facet is proportional to the length value of the side. Accordingly, by measuring the length of the side, it may be inferred whether at least one facet included on the first lithium iron phosphate surface has an area greater than or equal to a certain size.

In this specification, the length of a side in the cross section of a particle can be measured by the following method. When the cross section of the electrode is observed by SEM, according to the general definition of a side, the length of a straight line that makes an angle of a polygon is measured, or when the distance between a virtual line segment connecting any two points included on the circumference of the particle cross section and a part of the circumference of the particle cross section connecting the two arbitrary points is 50 nm or less, the length of the virtual line segment corresponds to an approximate value of the length of the side. Therefore, the length of the side may be calculated by measuring the length of the virtual line segment.

In this specification, the positive electrode adhesive force is measured through a 90-degree peel test, and can be measured by the following method. A positive electrode cut to a length of 150 mm and a width of 20 mm is prepared, a positive electrode active material layer is positioned to face a slide glass having a length of 75 mm and a width of 25 mm, and the positive electrode is attached to the slide glass in the longitudinal direction using a double-sided tape. That is, the slide glass is attached to a region corresponding to half of the longitudinal direction of the positive electrode. Thereafter, an evaluation sample is prepared by rubbing a roller 10 times so that the double-sided tape is uniformly attached. Next, the slide glass portion of the evaluation sample is fixed to a sample stage of the Universal Testing Machine (UTM) (product name: LS5, manufacturer: LLOYD), and the half of the positive electrode to which the slide glass is not attached is connected to a load cell of the UTM equipment. The load cell is moved up to 50 mm at a speed of 100 mm/min and the load applied to the load cell is measured. Here, the minimum value of the load measured in the 20 mm to 40 mm section of the driving section is obtained. This is repeated a total of 5 times, and the average value is evaluated as the positive electrode adhesive force (gf/20 mm) of each sample.

Hereinafter, the present disclosure will be specifically described.

Positive Electrode

A positive electrode according to some embodiments of the present disclosure includes a positive electrode active material layer including a first lithium iron phosphate and a second lithium iron phosphate as a positive electrode active material. In this case, the first lithium iron phosphate has an average particle diameter $D_{50}$ larger than that of the second lithium iron phosphate, includes at least one or more facet on the surface, and when a cross section of the positive electrode is observed using a scanning electron microscope (SEM), the cross section of the first lithium iron phosphate has at least one or more side having a length of 2 μm or more.

Since lithium iron phosphate has a poor lithium mobility and a low electrical conductivity compared to lithium transition metal oxides such as lithium nickel cobalt manganese oxide, lithium iron phosphate with a small average particle diameter is mainly used as a positive electrode active material. However, when the size of the lithium iron phosphate particles is small, the specific surface area increases, and as a result, aggregation of particles occurs severely so that the lithium iron phosphate and the binder cannot be effectively mixed, resulting in a decrease in positive electrode adhesive force. Accordingly, there is a problem in that the positive electrode active material layer is deintercalated during electrode manufacturing or charging/discharging, resulting in increased battery resistance and reduced capacity of the secondary battery.

As a result of repeated research to solve this problem, the present inventors have found that by including one or more facets greater than or equal to a certain size on the surface of the first lithium iron phosphate, and by using the first lithium iron phosphate having a large particle diameter and the second lithium iron phosphate having a small particle diameter together, the positive electrode adhesive force is significantly improved, which led them to complete the present disclosure. In the same manner as the present disclosure, when a large-sized lithium iron phosphate having a wide facet is used in combination, the facet comes into face-to-face contact with the positive electrode current collector, and as a result, the contact area with the current collector is widened, improving the positive electrode adhesive force. This will be explained in detail below.

The positive electrode according to some embodiments of the present disclosure may include a positive electrode active material layer. Specifically, the positive electrode according to the present disclosure may include a positive electrode current collector and the positive electrode active material layer positioned on at least one surface of the positive electrode current collector.

The positive electrode current collector is not particularly limited as long as it has conductivity without causing chemical change in the battery. For example, as the current collector, stainless steel, aluminum, nickel, titanium, baked carbon, or aluminum or stainless steel surface-treated with carbon, nickel, titanium, silver, etc. may be used.

The positive electrode current collector may have a thickness of 3 μm to 500 μm, and the adhesive force to the positive electrode active material layer may be increased by forming micro/nano-scaled unevenness on the surface of the positive electrode current collector. For example, it may be used in various forms such as films, sheets, foils, nets, porous materials, foams, non-woven fabrics, etc.

The positive electrode active material layer may include a positive electrode active material. Additionally, besides the positive electrode active material, the positive electrode active material layer may further include a conductor, a binder, and a dispersant, if necessary.

Hereinafter, each component included in the positive electrode active material layer will be described in detail.

(1) Positive Electrode Active Material

The present disclosure includes a first lithium iron phosphate and a second lithium iron phosphate as a positive electrode active material. Since lithium iron phosphate has an olivine structure, the active material structure is stably maintained at high temperatures compared to lithium transition metal oxide having a layered structure. As a result, when lithium iron phosphate is used as a positive electrode active material, high-temperature stability and high-temperature lifespan characteristics of the positive electrode are significantly improved, thereby reducing the risk of ignition in the lithium secondary battery including the positive electrode.

Meanwhile, the first lithium iron phosphate and the second lithium iron phosphate may have different average particle diameters $D_{50}$, and specifically, the average particle diameter $D_{50}$ of the first lithium iron phosphate may be greater than the average particle diameter $D_{50}$ of the second lithium iron phosphate.

The first lithium iron phosphate and the second lithium iron phosphate may each independently be a compound represented by Formula 1 below:

$$Li_{1+a}Fe_{1-x}M_x(PO_{4-b})X_b \quad \text{[Formula 1]}$$

wherein, in Formula 1, M includes one or two or more elements selected from the group consisting of Al, Mg, Ni, Co, Mn, Ti, Ga, Cu, V, Nb, Zr, Ce, In, Zn, and Y, X includes one or two or more elements selected from the group consisting of F, S, and N, $-0.5 \le a \le 0.5$, $0 \le b \le 0.1$, and $0 \le x \le 0.5$, respectively.

For example, the first lithium iron phosphate and the second lithium iron phosphate may be $LiFePO_4$, respectively.

The first lithium iron phosphate and the second lithium iron phosphate may each independently include a carbon coating layer on the surface. When a carbon coating layer is formed on the surface of lithium iron phosphate, electrical conductivity may be improved, thereby improving resistance characteristics of the positive electrode.

The carbon coating layer may be formed by using at least one raw material selected from the group consisting of glucose, sucrose, lactose, starch, oligosaccharide, polyoligosaccharide, fructose, cellulose, polymer of furfuryl alcohol, block copolymer of ethylene and ethylene oxide, vinyl-based resin, cellulose-based resin, phenolic-based resin, pitch-based resin, and tar-based resin. Specifically, the carbon coating layer may be formed through a process of heat-treating after mixing the raw materials with the lithium iron phosphate.

Preferably, the first lithium iron phosphate may be a primary particle having a monolith structure. In the present disclosure, the 'monolithic structure' means a structure in which the particles exist as independent phases in which the particles are not agglomerated with each other in a morphology phase. The first lithium iron phosphate, which is a primary particle of a monolithic structure, may include at least one facet on the surface.

The facet means a flat surface that forms a crystal, and may specifically correspond to a crystal surface. For example, the facet may be a flat surface formed on the surface of the first lithium iron phosphate, which is a primary particle of a monolithic structure, and having an area greater than or equal to a certain size. When rolling the first lithium iron phosphate particle having such a structure, its edges or corners are embedded in the positive electrode current collector, thereby increasing adhesion with the positive electrode current collector.

When observing the cross section of the positive electrode including the first lithium iron phosphate including a facet on the surface with a SEM, the cross section of the first lithium iron phosphate may be observed in a polygonal shape. In this case, the facet may correspond to the side of the polygon, and the side corresponding to the facet may be linear. The area value of the facet is proportional to the length value of the side. Accordingly, by measuring the length of the side, it may be inferred whether at least one facet included on the first lithium iron phosphate surface has an area greater than or equal to a certain size.

The length of side of the cross section of the first lithium iron phosphate can be measured by observing the cross section of the positive electrode using a SEM. Specifically, when the cross section of the positive electrode is observed by SEM, if the distance between a virtual line segment connecting any two points included on the circumference of the first lithium iron phosphate and a part of the circumference of the first lithium iron phosphate connecting the two arbitrary points is 50 nm or less, the length of the virtual line segment corresponds to an approximate value of the length of the side. Therefore, the length of the side may be calculated by measuring the length of the virtual line segment.

When a cross section of the positive electrode is observed with a scanning electron microscope (SEM), the cross section of the first lithium iron phosphate may have at least one or more side having a length of 2 μm or more. When the length of the side is less than 2 μm, it may be difficult to secure a sufficiently high positive electrode adhesive force because the area of the facet capable of surface-to-surface contact with the positive electrode current collector is small.

Specifically, when the cross section of the positive electrode is observed with a SEM, the cross section of the first lithium iron phosphate may have at least one or more side having a length of 2 μm to 8 μm, more specifically, 2 μm to 4 μm. When the length of the side satisfies the above range, at least one facet included on the surface of the first lithium iron phosphate may have an area above a certain size, and as the average particle diameter of the first lithium iron phosphate becomes excessively large, lithium mobility and electrical conductivity are lowered, thereby preventing problems of increasing battery resistance and deteriorating output performance.

The first lithium iron phosphate may be particles having a polygonal column shape. The polygonal column may be, for example, a square column, a pentagonal column, a hexagonal column, an octagonal column, or the like, but is not limited thereto. Each edge or corner formed on the polygonal column may have an angular shape and/or a rounded shape. When the lithium iron phosphate in the form of a polygonal column is included, its edges or corners are embedded in the positive electrode current collector during rolling of the positive electrode slurry, so the positive electrode active material is easily attached to the positive electrode current collector, thereby increasing the positive electrode adhesive force.

When the first lithium iron phosphate is particles having a polygonal column shape, a cross section of the first lithium iron phosphate may be a polygon in a cross section of a positive electrode including the first lithium iron phosphate. For example, the cross section may be triangular, quadrangular, pentagonal, hexagonal, octagonal, etc., but is not limited thereto.

The average particle diameter $D_{50}$ of the first lithium iron phosphate may be 2 μm to 8 μm, specifically 3 μm to 7 μm, and more specifically 4 μm to 6 μm. When the average particle diameter $D_{50}$ of the first lithium iron phosphate satisfies the above range, the area of the facet capable of surface-to-surface contact with the positive electrode current collector is widened, thereby improving the adhesive force of the positive electrode.

The first lithium iron phosphate may be used together with the second lithium iron phosphate having a small average particle diameter $D_{50}$. By concurrently using the second lithium iron phosphate having a smaller average particle diameter than the first lithium iron phosphate, the electrical resistance and output characteristics of the lithium secondary battery including the positive electrode are improved.

The second lithium iron phosphate may be secondary particles in which primary particles are aggregated with each other. Thus, the second lithium iron phosphate may not include a facet on the particle surface.

The average particle diameter $D_{50}$ of the second lithium iron phosphate may be 1 m or less, specifically 0.5 μm to 1 μm, and more specifically 0.8 μm to 1 μm. When the average particle diameter $D_{50}$ of the second lithium iron phosphate satisfies the above range, lithium mobility in the second lithium iron phosphate is improved, and thus the charging/discharging characteristics of the battery may be improved.

Within the positive electrode, the first lithium iron phosphate and the second lithium iron phosphate may be included in a volume ratio of from 10:90 to 40:60, specifically from 15:85 to 40:60, and more specifically from 20:80 to 35:65. When the volume ratio of the first lithium iron phosphate and the second lithium iron phosphate satisfies the above range, sufficient positive electrode adhesive force can be retained to prevent electrode deintercalation, thereby improving battery charging/discharging characteristics by an improvement in lithium mobility.

The positive electrode active material may be included in an amount of 90 wt % to 99 wt %, specifically 92 wt % to 97 wt %, and more specifically 94 wt % to 97 wt % in the positive electrode active material layer. When the content of the positive electrode active material satisfies the above range, battery capacity of the positive electrode may be improved by retaining sufficient positive electrode energy density.

(2) Conductor

The conductor is not particularly limited as long as it has conductivity without causing chemical change in the battery, and examples thereof include graphite; carbon black such as carbon black, acetylene black, ketjen black, channel black, furnace black, lamp black, thermal black, etc.; conductive fibers such as carbon fiber, metal fiber, etc.; carbon fluoride; metal powders such as aluminum, and nickel powder, etc.; conductive whiskeys such as zinc oxide, potassium titanate, etc.; conductive metal oxides such as titanium oxide, etc.; conductive materials such as a polyphenylene derivative, etc. Specific examples of commercially available conductors include acetylene black series (Chevron Chemical Company) or Denka Black (Denka Singapore Private Limited), Gulf Oil Company products, etc., Ketjenblack, EC series (Armak Company products), Vulcan XC-72 (Cabot Company product), and Super P (Timcal Company product), etc. Preferably, the conductor may be carbon nanotubes. Since the conductive network of carbon nanotubes is capable of mitigating migration of the binder during the drying process of the positive electrode slurry composition, it is particularly preferable as a conductor included in the positive electrode of the present disclosure.

The conductor in the positive electrode active material layer may be included in an amount of 0.3 wt % to 2.0 wt %, specifically 0.6 wt % to 1.5 wt %, and more specifically 0.8 wt % to 1.2 wt %. When the content of the conductor in the positive electrode active material layer satisfies the above range, electrical conductivity of the positive electrode may be improved by securing the positive electrode conductive network.

(3) Binder

A binder plays a role of assisting in the bond between the positive electrode active material and the conductor and the bonding to the current collector. Specific examples include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene polymer (EPDM), sulfonated-EPDM, styrene-butadiene rubber, fluoro-rubber, or various copolymers thereof, and the like, and one or a mixture of two or more of these may be used.

The binder in the positive active material layer may be included in an amount of 1.0 wt % to 5.0 wt %, specifically 1.5 wt % to 4.0 wt %, and more specifically 2.0 wt % to 3.5 wt %. When the content of the binder satisfies the above range, the contact area between the binder and lithium iron phosphate becomes greater to retain an excellent positive electrode adhesive force.

(4) Dispersant

A dispersant suppresses an excessive aggregation phenomenon of lithium iron phosphate in the positive electrode slurry composition, and enables lithium iron phosphate to be effectively dispersed and exist in the prepared positive electrode active material layer.

The dispersant may include a hydrogenated nitrile-based copolymer, and specifically, the dispersant may be a hydrogenated nitrile-based copolymer.

Specifically, the hydrogenated nitrile-based copolymer is a copolymer comprising an $\alpha,\beta$-unsaturated nitrile-derived structural unit and a hydrogenated conjugated diene-derived structural unit, or a copolymer comprising an $\alpha,\beta$-unsaturated nitrile-derived structural unit, a conjugated diene-derived structural unit, and a hydrogenated conjugated diene-derived structural unit. As the $\alpha,\beta$-unsaturated nitrile monomer, for example, acrylonitrile or methacrylonitrile, etc. may be used, and one or a mixture of two or more of these monomers may be used. As the conjugated diene-based monomer, for example, conjugated diene-based monomers having 4 to 6 carbon atoms such as 1,3-butadiene, isoprene, or 2,3-methyl butadiene, etc. may be used, and one or a mixture of two or more of these monomers may be used.

More specifically, the hydrogenated nitrile-based copolymer may be a hydrogenated nitrile butadiene rubber (H—NBR).

The dispersant in the positive electrode active material layer may be included in an amount of 1.5 wt % or less, specifically 0.1 wt % to 0.8 wt %, and more specifically 0.2 wt % to 0.4 wt %. When the content of the dispersant satisfies the above range, the aggregation of the conductor in the positive electrode active material layer may be suppressed, thereby improving the positive electrode conductive network.

According to some embodiments of the present disclosure, the positive electrode active material layer includes 94.9 to 97.0 wt % of the positive electrode active material, 0.8 to 1.2 wt % of the conductor, 2.0 to 3.5 wt % of the binder; and 0.2 to 0.4 wt % of the dispersant. When the composition of the positive electrode active material layer satisfies the above range, the capacity and resistance performance of the lithium secondary battery including the positive electrode may be optimized by increasing the content of the active material while retaining the adhesive force and conductivity of the electrode.

The positive electrode may be manufactured according to a conventional positive electrode manufacturing method except that the positive electrode active material described above is used. Specifically, the positive electrode is prepared by preparing a positive electrode slurry composition including the positive electrode active material, the conductor, the binder and/or the dispersant, and then applying the positive electrode slurry composition on a positive electrode current collector, followed by drying and rolling.

In addition, as another method, the positive electrode may be prepared by casting the positive electrode slurry composition on a separate support, and then laminating a film obtained from peeling the support on a positive electrode current collector.

The positive electrode according to some embodiments of the present disclosure may have an excellent positive electrode adhesive force. Specifically, in the positive electrode, the positive electrode active material layer may have improved adhesive force to the positive electrode current collector. As a result, since the deintercalation of the positive electrode is prevented, the cell resistance of the secondary battery is reduced, and the capacity and output characteristics of the battery are improved, thereby reducing defects occurring in the manufacturing process.

The positive electrode according to some embodiments of the present disclosure has a structure in which the positive electrode active material layer directly faces the positive electrode current collector, and may not include a separate layer for improving the adhesive force between the positive electrode active material layer and the positive electrode current collector. That is, even if the positive electrode according to the present disclosure does not include a separate layer such as a binding layer or an adhesive layer or a bonding layer or a primer coating layer that may be interposed between the positive electrode current collector and the positive electrode active material layer to improve the adhesive force, it can have an excellent interfacial adhesive force between the positive electrode current collector and the positive electrode active material layer.

The adhesive force between the positive electrode current collector and the positive electrode active material layer measured through a 900 peel test may be 70 gf/20 mm to 200 gf/20 mm, specifically 80 gf/20 mm to 170 gf/20 mm, more specifically 90 gf/20 mm to 150 gf/20 mm. This range corresponds to a level higher than the positive electrode adhesive force of a conventional positive electrode using lithium iron phosphate. This can be manifested because the first lithium iron phosphate having a large particle size and the second lithium iron phosphate having a small particle size are used in combination, and among them, the first lithium iron phosphate includes at least one or more facet greater than or equal to a certain size on the particle surface.

Lithium Secondary Battery

Next, a lithium secondary battery according to the present disclosure will be described.

A lithium secondary battery according to some embodiments of the present disclosure may include a positive electrode, a negative electrode, a separator interposed between the positive electrode and the negative electrode, and an electrolyte.

In the lithium secondary battery, the positive electrode is as described above. For example, the positive electrode includes a positive electrode active material layer including a first lithium iron phosphate and a second lithium iron phosphate as a positive electrode active material. The first lithium iron phosphate has an average particle diameter $D_{50}$ greater than that of the second lithium iron phosphate, and includes at least one or more facet greater than or equal to a certain size on the surface of the particle. In this case, when the cross section of the positive electrode is observed with a scanning electron microscope (SEM), the cross section of the first lithium iron phosphate has at least one or more side having a length of 2 μm or more.

Additionally, the positive electrode may further include a conductor, a binder, and a dispersant.

The negative electrode may be manufactured, for example, by preparing a composition for forming the negative electrode including a negative electrode active material, a negative electrode binder, and a negative electrode conductor, and then applying the composition on a negative electrode current collector.

The negative electrode active material is not particularly limited, and a compound capable of reversible intercalation and deintercalation of a conventional lithium may be used. Specific examples include carbonaceous materials such as artificial graphite, natural graphite, graphitized carbon fiber, amorphous carbon, high-crystalline carbon, etc.; (semi) metal-based materials capable of being alloyed with lithium such as Si, Al, Sn, Pb, Zn, Bi, In, Mg, Ga, Cd, Si alloy, Sn alloy, or Al alloy; or complex compounds containing a metallic compound and a carbonaceous material. Also, low-crystalline carbon includes soft carbon and hard carbon, and high crystalline carbon includes high-temperature baked carbon such as natural graphite, kish graphite, pyrolytic carbons, mesophase pitch based carbon fibers, meso-carbon microbeads, mesophase pitches, and petroleum or coal tar pitch derived cokes, etc. Among them, one or a mixture of two or more of these may be used, and as the negative electrode active material, a metal lithium thin film may be used.

The negative electrode conductor is used to give conductivity to the electrode, and regarding the configured battery, any material having electronic conductivity without causing chemical change in the battery may be used without particular limitation. Specific examples include graphite such as natural graphite or artificial graphite, etc.; carbon-based materials such as carbon black, acetylene black, ketjen black, channel black, furnace black, lamp black, thermal black, carbon fiber, carbon nanotube, etc.; metal powders such as copper, nickel, aluminum, silver, etc. or metal fibers; conductive whiskers such as zinc oxide, potassium titanate, etc.; conductive metal oxides such as titanium oxide, etc.; or conductive polymers such as polyphenylene derivatives, etc., and one of them alone or a mixture of two or more may be used. The negative electrode conductor based on the total weight of the negative electrode active material layer may be conventionally included in an amount of 1 to 30 wt %, specifically 1 to 20 wt %, and more specifically 1 to 10 wt %.

The negative electrode binder serves to improve the adhesive force between particles of the negative electrode active material and the adhesive force between the negative electrode active material and the negative electrode current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene monomer rubber (EPDM rubber), sulfonated-EPDM, styrene-butadiene rubber (SBR), fluororubber, or various copolymers thereof, and the like, and one alone or a mixture of two or more of these may be used. The negative electrode binder based on the total weight of the negative electrode active material layer may be included in an amount of 1 to 30 wt %, specifically 1 to 20 wt %, and more specifically 1 to 10 wt %.

Meanwhile, the negative electrode current collector is not particularly limited as long as it has high conductivity without causing chemical change in the battery. For example, copper, stainless steel, aluminum, nickel, titanium, baked carbon, or copper or stainless steel surface-treated with carbon, nickel, titanium, silver, etc., or aluminum-cadmium alloy, etc. may be used.

Further, the negative electrode current collector may typically have a thickness of 3 μm to 500 μm, and in the same manner as the positive electrode current collector, the coupling force of the negative electrode active material may be increased by forming micro/nano-scaled unevenness on the surface of the negative electrode current collector. For example, it may be used in various forms such as films, sheets, foils, nets, porous materials, foams, non-woven fabrics, etc.

Meanwhile, in the lithium secondary battery, the separator can be used without limitation as long as it is conventionally used as a separator in a lithium secondary battery, and in particular, it is preferable to have low resistance to the ion movement of the electrolyte and an excellent ability to impregnate the electrolyte. Specifically, a porous polymer film, for example, a porous polymer film made of polyolefin-based polymers such as ethylene homopolymer, ethylene/butene copolymer, ethylene/hexene copolymer, and ethylene/methacrylate copolymer, etc. or a laminated structure of two or more layers of these may be used. In addition, conventional porous non-woven fabrics, for example, non-woven fabrics made of high melting point glass fibers, polyethylene terephthalate fibers, and the like may be used. In addition, the separator may be a porous thin film having a pore diameter of 0.01 μm to 10 μm and a thickness of 5 μm to 300 μm.

Meanwhile, in the lithium secondary battery, the electrolyte may include an organic solvent and a lithium salt commonly used for electrolytes, but is not particularly limited.

The organic solvent may be used without particular limitation as long as it can serve as a medium through which ions involved in the electrochemical reaction of the battery can move. Specifically, as the organic solvent, ester-based solvents such as methyl acetate, ethyl acetate, γ-butyrolactone, ε-caprolactone, etc.; ether-based solvents such as dibutyl ether or tetrahydrofuran, etc.; ketone-based solvents such as cyclohexanone, etc.; aromatic hydrocarbon-based solvents such as benzene, fluorobenzene, etc.; carbonate-based solvents such as dimethylcarbonate (DMC), diethylcarbonate (DEC), ethylmethylcarbonate (EMC), ethylene carbonate (EC), propylenecarbonate (PC), etc. may be used.

Among the above, carbonate-based solvents are preferred, and a mixture of cyclic carbonates (e.g., ethylene carbonate or propylene carbonate, etc.) having high ionic conductivity and high dielectric constant capable of increasing the charging/discharging performance of the battery, and low-viscosity linear carbonate-based compounds (e.g., ethylmethylcarbonate, dimethylcarbonate, or diethylcarbonate, etc.) is more preferable.

The lithium salt may be used without particular limitation as long as it is a compound capable of providing lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$, etc. may be used. The lithium salt is preferably included in the electrolyte in a concentration of about 0.6 mol % to 2 mol %.

In the electrolyte, besides the above electrolyte components, for purposes such as battery lifespan characteristics improvement, battery capacity reduction inhibition, battery discharge capacity improvement, etc., for example, one or more additives such as pyridine, triethyl phosphite, triethanolamine, cyclic ether, ethylene diamine, n-glyme, hexamethyl phosphoric triamide, nitrobenzene derivative, sulfur, quinone imine dye, N-substituted oxazolidinone, N, N-substituted imidazolidine, ethylene glycol dialkyl ether, ammonium salt, pyrrole, 2-methoxy ethanol, or aluminum trichloride etc. may be further included. Here, the additive based on the total weight of the electrolyte may be included in an amount of 0.1 to 5 wt %.

The lithium secondary battery of the present disclosure may be prepared by disposing a separator between a positive electrode and a negative electrode to form an electrode assembly, inserting the electrode assembly into a cylindrical battery case or a prismatic battery case, and then injecting an electrolyte. In addition, it can be prepared by stacking the electrode assembly, impregnating it with the electrolyte, putting the resultant into a battery case, and then sealing it.

When preparing the lithium secondary battery of the present disclosure, one or more organic solvent selected from the group consisting of N-methyl-2-pyrrolidone (NMP), acetone, ethanol, propylene carbonate, ethyl methyl carbonate, ethylene carbonate, and dimethyl carbonate may be removed by drying the electrode assembly. If an electrolyte having the same components as the organic solvents used in preparing the positive electrode is used as the electrolyte, the process of drying the electrode assembly may be omitted.

Unlike the lithium secondary battery described above, a lithium secondary battery according to some embodiments of the present disclosure may be a solid-state battery.

The battery case may be one commonly used in the art, and has no limitation on its appearance according to the purpose of the battery, and for example, it may be a cylindrical-type that uses a can, a prismatic-type, a pouch-type, or a coin-type, etc.

The lithium secondary battery according to the present disclosure has an excellent discharge capacity, excellent output characteristics, and a stable capacity retention rate, so it is useful for portable devices such as mobile phones, laptops, digital cameras, etc., Energy Storage System (ESS), and electric vehicles such as hybrid electric vehicle (HEV), etc.

Hereinafter, the present disclosure will be described in more detail by the Examples. However, the following Examples are for illustrative purposes and the scope of the present disclosure is not limited thereto.

Example 1: Preparation of Positive Electrode (1) Preparation of Positive Electrode Slurry Composition As the first lithium iron phosphate, $LiFePO_4$, which is a primary particle having an average particle diameter $D_{50}$ of 5 μm and having a monolithic structure, was used, and as the second lithium iron phosphate, $LiFePO_4$, which is a secondary particle having an average particle diameter $D_{50}$ of 0.9 μm, was used. The first lithium iron phosphate, the second lithium iron phosphate, carbon nanotube (CNT), polyvinylidene fluoride (PVdF), and hydrogenated nitrile butadiene rubber (H—NBR) were added to a N-methylpyrrolidone (NMP) solvent and stirred to prepare a positive electrode slurry composition. In the positive electrode slurry composition, the positive active material, the conductor, the binder, and the dispersant were present in a weight ratio of 95.7:1.0:3.0:0.3, the solid content of the positive electrode slurry composition was 60 wt %, and the first lithium iron phosphate and the second lithium iron phosphate were included in a volume ratio of 3:7.

(2) Preparation of Positive Electrode

After applying the positive electrode slurry composition on a 15 m-thick aluminum thin film, it was vacuum dried at 130° C. for 20 minutes so that the solid content of the positive electrode slurry composition became 99.0 wt % or more. Then, the positive electrode was prepared by rolling the dried positive electrode slurry composition so that the porosity of the positive electrode active material layer became 29%. The thickness of the positive electrode active material layer was 91 μm, and the loading amount of the positive electrode active material layer was 3.5 mAh/cm$^2$.

Example 2

A positive electrode was prepared in the same manner as in Example 1, except that the average particle diameter $D_{50}$ of the first lithium iron phosphate was 7 μm.

Example 3

A positive electrode was prepared in the same manner as in Example 1, except that the volume ratio between the first lithium iron phosphate and the second lithium iron phosphate included was changed to 2:8.

Comparative Example 1: Preparation of Positive Electrode

A positive electrode was prepared in the same manner as in Example 1, except that the first lithium iron phosphate was not used.

Comparative Example 2: Preparation of Positive Electrode

A positive electrode was prepared in the same manner as in Example 1, except that $LiFePO_4$, a secondary particle having an average particle diameter $D_{50}$ of 12 μm, was used as the first lithium iron phosphate.

Comparative Example 3: Preparation of Positive Electrode

A positive electrode was prepared in the same manner as in Example 1, except that the average particle diameter $D_{50}$ of the first lithium iron phosphate was 3 μm.

TABLE 1

| | First lithium iron phosphate | | Second lithium iron phosphate | | Volume ratio of first lithium iron phosphate:second lithium iron phosphate |
|---|---|---|---|---|---|
| | Particle type | Average particle diameter $D_{50}$ (μm) | Particle type | Average particle diameter $D_{50}$ (μm) | |
| Comparative Example 1 | — | — | Secondary particle | 0.9 | — |
| Comparative Example 2 | Secondary particle | 12 | Secondary particle | 0.9 | 3:7 |
| Comparative Example 3 | Primary particle | 3 | Secondary particle | 0.9 | 3:7 |
| Example 1 | Primary particle | 5 | Secondary particle | 0.9 | 3:7 |
| Example 2 | Primary particle | 7 | Secondary particle | 0.9 | 3:7 |
| Example 3 | Primary particle | 5 | Secondary particle | 0.9 | 2:8 |

Experimental Example 1—Visually Confirming the Presence of a Facet of Lithium Iron Phosphate The positive electrode slurry composition respectively prepared in Examples 1 to 3 and Comparative Examples 1 to 3 and cross section of the positive electrode were observed with SEM, respectively, and it was visually confirmed whether a facet existed on the surface of lithium iron phosphate.

Specifically, when observing the cross section of the positive electrode with SEM, the cross section of the first lithium iron phosphate including the facet on the surface may be observed in a polygonal shape having sides greater than or equal to a certain length. In addition, when observing the positive electrode slurry with SEM, the first lithium iron phosphate including the facet on the surface may be observed in a form of a polygonal column having a surface greater than or equal to a certain area.

FIG. 1 is a SEM image of a cross-section of a positive electrode prepared in Example 1, FIG. 2 is a SEM image of a positive electrode slurry prepared in Example 1, FIG. 3 is a SEM image of a cross-section of a positive electrode prepared in Comparative Example 1, FIG. 4 is a SEM image of a cross-section of a positive electrode prepared in Comparative Example 2, FIG. 5 is a SEM image of a positive electrode slurry prepared in Comparative Example 2, FIG. 6 is a SEM image of a cross-section of a positive electrode prepared in Comparative Example 3, and FIG. 7 is a SEM image of a positive electrode slurry prepared in Comparative Example 3.

Whether a facet exists on the surface of lithium iron phosphate was visually confirmed, and the result was shown in Table 2 below.

O: facet exists

X: facet does not exist

Experimental Example 2—Checking the Length of the Side of the First Lithium Iron Phosphate Cross Section In order to estimate the size of the area of the facet included in the first lithium iron phosphate, the cross section of each positive electrode prepared in Examples 1 to 3 and Comparative Examples 1 to 3 was observed by SEM, and the length of the side of the cross section of the first lithium iron phosphate was checked.

Specifically, after a surface treatment of the cross section of the positive electrode respectively prepared in Examples 1 to 3 and Comparative Examples 1 to 3 through ion-milling, a region having an area of 50 μm×50 μm among the cross section of the positive electrode was observed by a SEM. In the SEM image of the cross section of the positive electrode, lithium iron phosphate was observed as a light contrast, and the binder was observed as a dark contrast. In addition, the cross section of the first lithium iron phosphate was observed in the form of a polygon, and the side of the cross section of the first lithium iron phosphate was observed from a difference between the contrast of the positive electrode active material and the binder.

In this case, in the SEM image of the cross section of the positive electrode, when the distance between a virtual line segment connecting two arbitrary points included on the circumference of the cross section of the first lithium iron phosphate and a part of the circumference connecting the two arbitrary points is 50 nm or less, the length of the virtual line segment corresponds to an approximate value of the length of the side. Therefore, the length of the side was calculated by measuring the length of the virtual line segment, and whether the length of the side was 2 μm or more was checked and was shown in Table 2 below.

O: A side with a length of 2 μm or more exists in the cross section of the first lithium iron phosphate X: A side with a length of 2 μm or more does not exist in the cross section of the first lithium iron phosphate Experimental Example 3—Evaluation of Positive Electrode Adhesive Force In each of the positive electrodes prepared in Examples 1 to 3 and Comparative Examples 1 to 3, adhesive force between the positive electrode active material layer and the positive electrode current collector was compared.

Specifically, each of the positive electrodes prepared in Examples 1 to 3 and Comparative Examples 1 to 3 was cut to a length of 150 mm and a width of 20 mm, and the surface of the positive electrode was attached to a slide glass having a length of 75 mm and a width of 25 mm in the longitudinal direction using a double-sided tape. That is, the slide glass was attached to a region corresponding to half of the longitudinal direction of the positive electrode. Thereafter, an evaluation sample was prepared by rubbing a roller 10 times so that the double-sided tape was uniformly attached.

Next, the slide glass portion of the evaluation sample was fixed to a sample stage of the Universal Testing Machine (UTM) (product name: LS5, manufacturer: LLOYD), and the half of the positive electrode to which the slide glass was not attached was connected to a load cell of the UTM equipment. The load cell was moved up to 50 mm at a speed of 100 mm/min and the load applied to the load cell was measured. Here, the minimum value of the load measured in the 20 mm to 40 mm section of the driving section was measured as the positive electrode adhesive force (gf/20 mm) of each sample. After a total of 5 measurements for each positive electrode, the average value was shown in Table 2 below.

TABLE 2

| | Whether there is a lithium iron phosphate facet in the cross section of the electrode slurry and the electrode | Whether there is a side with a length of 2 μm or more in the cross section of the lithium iron phosphate | Adhesive force of positive electrode (gf/20 mm) |
|---|---|---|---|
| Comparative Example 1 | X | X | 53 |
| Comparative Example 2 | X | X | 56 |
| Comparative Example 3 | ○ | X | 63 |
| Example 1 | ○ | ○ | 106 |
| Example 2 | ○ | ○ | 108 |
| Example 3 | ○ | ○ | 100 |

Through Table 2, it can be confirmed that the positive electrodes of Comparative Examples 1 and 2, which do not include a facet on the surface of lithium iron phosphate, have a significantly lower positive electrode adhesive force compared to the positive electrode of Example 1.

In addition, it can be confirmed that the positive electrode of Comparative Example 3, in which the length of the side of the first lithium iron phosphate cross section is less than 2 μm, has a significantly lower positive electrode adhesive force compared to the positive electrode of Example 1. This is considered to be because the facet formed on the surface of the first lithium iron phosphate in the positive electrode of Comparative Example 3 has an area less than a certain size.

Meanwhile, in the case of the positive electrodes of Examples 1 to 3 having at least one side having a length of 2 μm or more in the cross section of the first lithium iron phosphate, it can be confirmed that the positive electrode adhesive force is significantly higher than that of the positive electrodes of Comparative Examples 1 to 3. This is considered to be because the facet formed on the surface of the first lithium iron phosphate in the positive electrodes of the Examples has an area above a certain size. Moreover, as shown in FIG. 1, it is considered to be because each edge and/or corner included in the first lithium iron phosphate particle in the positive electrodes of the Examples is embedded in the positive electrode current collector.

The invention claimed is:

1. A positive electrode comprising a positive electrode active material layer, wherein the positive electrode active material layer comprises a first lithium iron phosphate and a second lithium iron phosphate as a positive electrode active material, wherein the first lithium iron phosphate has an average particle diameter $D_{50}$ greater than that of the second lithium iron phosphate, when the cross section of the positive electrode is observed with a scanning electron microscope (SEM), the cross section of the first lithium iron phosphate has at least one side having a length of 2 μm or more, and wherein the positive electrode comprises a positive electrode current collector, and the positive electrode active material layer formed on at least one surface of the positive electrode current collector, wherein an adhesive force between the positive electrode current collector and the positive electrode active material layer measured through a 90-degree peel test is 70 gf/20 mm to 200 gf/20 mm.

2. The positive electrode of claim 1, wherein the first lithium iron phosphate and the second lithium iron phosphate are compounds that are each independently represented by Formula 1 below-, $$Li_{1+a}Fe_{1-x}M_x(PO_{4-b})X_b \quad \text{[Formula 1]}$$

wherein, M is one or more elements selected from the group consisting of Al, Mg, Ni, Co, Mn, Ti, Ga, Cu, V, Nb, Zr, Ce, In, Zn, and Y, X is one or more elements selected from the group consisting of F, S, and N, $-0.5 \le a \le 0.5$, $0 \le b \le 0.1$, and $0 \le x \le 0.5$.

3. The positive electrode of claim 1, wherein the first lithium iron phosphate is a primary particle having a monolith structure having at least one facet on its surface.

4. The positive electrode of claim 1, wherein the average particle diameter $D_{50}$ of the first lithium iron phosphate is 2 μm to 8 μm.

5. The positive electrode of claim 1, wherein the first lithium iron phosphate is a particle in a form of a polygonal column.

6. The positive electrode of claim 1, wherein within the positive electrode active material layer, the first lithium iron phosphate and the second lithium iron phosphate are contained in a volume ratio of from 10:90 to 40:60.

7. The positive electrode of claim 1, wherein the average particle diameter $D_{50}$ of the second lithium iron phosphate is 1 μm or less.

8. The positive electrode of claim 1, wherein the second lithium iron phosphate is a secondary particle in which primary particles are aggregated with each other.

9. The positive electrode of claim 1, wherein the positive electrode active material layer further comprises a conductor, a binder, and a dispersant.

10. The positive electrode of claim 9, wherein the positive electrode active material layer comprises:

94.9 to 97.00 wt % of the positive electrode active material, 0.8 to 1.2 wt % of the conductor, 2.0 to 3.5 wt % of the binder; and 0.2 to 0.4 wt % of the dispersant.

11. The positive electrode of claim 9, wherein the conductor is a carbon nanotube.

12. The positive electrode of claim 9, wherein the dispersant is a hydrogenated nitrile butadiene rubber.

13. The positive electrode of claim 1, wherein the positive electrode active material layer directly faces a positive electrode current collector.

14. A lithium secondary battery comprising the positive electrode of claim 1.

* * * * *